United States Patent
Tao et al.

(10) Patent No.: US 9,430,383 B2
(45) Date of Patent: Aug. 30, 2016

(54) FAST DATA INITIALIZATION

(71) Applicant: Oracle International Corporation, Redwood Shores, CA (US)

(72) Inventors: Zuoyu Tao, Belmont, CA (US); Jia Shi, Burlingame, CA (US); Kothanda Umamageswaran, Sunnyvale, CA (US); Selcuk Aya, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 96 days.

(21) Appl. No.: 14/336,860

(22) Filed: Jul. 21, 2014

(65) Prior Publication Data

US 2015/0089138 A1     Mar. 26, 2015

Related U.S. Application Data

(60) Provisional application No. 61/880,631, filed on Sep. 20, 2013.

(51) Int. Cl.
*G06F 12/08* (2016.01)
*G06F 3/06* (2006.01)
(Continued)

(52) U.S. Cl.
CPC ............ *G06F 12/0806* (2013.01); *G06F 3/06* (2013.01); *G06F 17/30115* (2013.01); *G06F 12/0246* (2013.01); *G06F 12/0804* (2013.01); *G06F 12/0866* (2013.01); *G06F 2212/1008* (2013.01); *G06F 2212/1024* (2013.01); *G06F 2212/225* (2013.01); *G06F 2212/46* (2013.01);
(Continued)

(58) Field of Classification Search
CPC .............. G06F 12/0806; G06F 17/30067; G06F 3/0632; G06F 3/0643
See application file for complete search history.

(56) References Cited

U.S. PATENT DOCUMENTS

| 4,425,615 A | 1/1984 | Swenson et al. |
|---|---|---|
| 5,717,893 A | 2/1998 | Mattson |
| 5,943,689 A * | 8/1999 | Tamer ................... G06F 3/0607 711/166 |

(Continued)

FOREIGN PATENT DOCUMENTS

| GB | 2409 301 A | 6/2005 |
|---|---|---|
| WO | WO 93/18461 | 9/1993 |
| WO | WO2012/032184 A1 | 3/2012 |

OTHER PUBLICATIONS

Microsoft, Database Instant File Initialization, 2016 Available at: https://msdn.microsoft.com/en-us/library/ms175935.aspx.*

(Continued)

*Primary Examiner* — Ryan Bertram
(74) *Attorney, Agent, or Firm* — Hickman Palermo Becker Bingham LLP

(57) ABSTRACT

A method and system for fast file initialization is provided. An initialization request to create or extend a file is received. The initialization request comprises or identifies file template metadata. A set of allocation units are allocated, the set of allocation units comprising at least one allocation unit for the file on a primary storage medium without initializing at least a portion of the file on the primary storage medium. The file template metadata is stored in a cache. The cache resides in at least one of volatile memory and persistent flash storage. A second request is received corresponding to a particular allocation unit of the set of allocation units. Particular file template metadata associated with the particular allocation unit is obtained. In response to the second request, at least a portion of a new allocation unit is generated.

25 Claims, 6 Drawing Sheets

(51) Int. Cl.
*G06F 17/30* (2006.01)
*G06F 12/02* (2006.01)

(52) U.S. Cl.
CPC ............... *G06F2212/7207* (2013.01); *G06F 2212/7208* (2013.01)

(56) References Cited

U.S. PATENT DOCUMENTS

| | | |
|---|---|---|
| 6,457,105 B1 | 9/2002 | Spencer et al. |
| 6,728,823 B1 | 4/2004 | Walker et al. |
| 6,922,754 B2 | 7/2005 | Liu et al. |
| 7,069,324 B1 | 6/2006 | Tiwana et al. |
| 7,159,076 B2 | 1/2007 | Madter |
| 7,165,144 B2 | 1/2007 | Choubal et al. |
| 7,290,090 B2 | 10/2007 | Madter |
| 7,461,147 B1 | 12/2008 | Mowat et al. |
| 7,506,103 B2 | 3/2009 | Madter |
| 7,636,814 B1 | 12/2009 | Karr et al. |
| 7,836,262 B2 | 11/2010 | Gunna et al. |
| 7,904,562 B2 | 3/2011 | Takase et al. |
| 8,244,984 B1 | 8/2012 | Glasco et al. |
| 8,327,080 B1 | 12/2012 | Der |
| 8,359,429 B1 | 1/2013 | Sharma et al. |
| 8,370,452 B2 | 2/2013 | Harvell et al. |
| 2002/0059287 A1* | 5/2002 | Karasudani ............ G06F 11/004 |
| 2004/0117441 A1 | 6/2004 | Liu et al. |
| 2004/0148486 A1 | 7/2004 | Burton |
| 2004/0225845 A1 | 11/2004 | Kruckemyer et al. |
| 2004/0254943 A1 | 12/2004 | Malcolm |
| 2005/0160224 A1 | 7/2005 | Cuomo et al. |
| 2005/0193160 A1 | 9/2005 | Bhatte et al. |
| 2005/0210202 A1 | 9/2005 | Choubal et al. |
| 2006/0106890 A1 | 5/2006 | Paul et al. |
| 2006/0271605 A1 | 11/2006 | Petruzzo |
| 2007/0067575 A1 | 3/2007 | Morris et al. |
| 2007/0078914 A1* | 4/2007 | Correl ............... G06F 17/30082 |
| 2007/0260819 A1 | 11/2007 | Gao et al. |
| 2008/0016283 A1 | 1/2008 | Madter |
| 2008/0046736 A1 | 2/2008 | Arimilli et al. |
| 2008/0235479 A1* | 9/2008 | Scales .................. G06F 3/0608 |
| | | 711/166 |
| 2008/0281784 A1 | 11/2008 | Zane et al. |
| 2009/0182960 A1 | 7/2009 | Crockett |
| 2009/0193189 A1 | 7/2009 | Carswell et al. |
| 2009/0248871 A1 | 10/2009 | Takase et al. |
| 2010/0017556 A1 | 1/2010 | Chin et al. |
| 2010/0070448 A1* | 3/2010 | Omoigui ............ H01L 27/1463 |
| | | 706/47 |
| 2010/0122026 A1 | 5/2010 | Umamageswaran et al. |
| 2010/0205367 A1 | 8/2010 | Ehrlich |
| 2011/0016157 A1 | 1/2011 | Bear et al. |
| 2011/0022801 A1 | 1/2011 | Flynn |
| 2011/0029569 A1 | 2/2011 | Ganesh et al. |
| 2011/0137940 A1 | 6/2011 | Gradin et al. |
| 2011/0173325 A1 | 7/2011 | Cherian et al. |
| 2011/0191522 A1* | 8/2011 | Condict ............... G06F 12/123 |
| | | 711/103 |
| 2011/0191543 A1 | 8/2011 | Craske et al. |
| 2012/0173515 A1 | 7/2012 | Jeong et al. |
| 2013/0086330 A1 | 4/2013 | Baddepudi |
| 2013/0212332 A1 | 8/2013 | Umamageswaran |
| 2013/0326152 A1 | 12/2013 | Loaiza et al. |
| 2014/0281247 A1 | 9/2014 | Loaiza et al. |
| 2014/0281272 A1 | 9/2014 | Loaiza et al. |

OTHER PUBLICATIONS

U.S. Appl. No. 13/840,811, filed Mar. 15, 2013, Office Action, Jan. 12, 2015.
U.S. Appl. No. 13/485,557, filed May 31, 2012, Notice of Allowance, Feb. 11, 2015.
U.S. Appl. No. 13/288,785, filed Nov. 3, 2011, Final Office Action, Jan. 5, 2015.
W3Schools "SQL Update Statement", Wayback Machine darted Apr. 19, 2012, on the internet www.w3schools.com/sql/sql_update.asp>, 1 page.
U.S. Appl. No. 12/691,146, filed Jan. 21, 2010, Office Action, Aug. 17, 2012.
U.S. Appl. No. 12/562,984, filed Sep. 18, 2009, Final Office Action, Nov. 1, 2012.
U.S. Appl. No. 12/631,985, filed Dec. 7, 2009, Office Action, May 13, 2013.
U.S. Appl. No. 12/691,146, filed Jan. 21, 2010, Examiners Answers, Apr. 29, 2013.
U.S. Appl. No. 12/631,985, filed Dec. 7, 2009, Final Office Action, Sep. 23, 2013.
U.S. Appl. No. 12/631,985, filed Dec. 7, 2009, Office Action, Jan. 14, 2014.
U.S. Appl. No. 13/485,557, filed May 31, 2012, Office Action, Mar. 5, 2014.
U.S. Appl. No. 13/288,785, filed Nov. 3, 2011, Office Action, Mar. 31, 2014.
Dittrich et al., "Towards a One Size Fits All Database Architecture" Proceedings of the 5th Biennial Conference on Innovative Data Systems Research, dated Jan. 6, 2011, 4 pages.
U.S. Appl. No. 13/840,811, filed Mar. 15, 2013, Final Office Action, Jul. 15, 2015.
U.S. Appl. No. 13/288,785, filed Nov. 3, 2011, Final Office Action

* cited by examiner

US 9,430,383 B2

FAST DATA INITIALIZATION

CROSS-REFERENCE TO RELATED APPLICATIONS; BENEFIT CLAIM

This application claims the benefit of Provisional Appln. 61/880,631, filed Sep. 20, 2013, the entire contents of which is hereby incorporated by reference as if fully set forth herein, under 35 U.S.C. §119(e).

This application is related to: U.S. application Ser. No. 13/288,785, Write-Back Storage Cache Based On Fast Persistent Memory, filed by Bharat Chandra Baddepudi, et al. on Nov. 3, 2011; U.S. application Ser. No. 13/485,557, Rapid Recovery From Loss Of Storage Device Cache, filed by Juan R. Loaiza, et al. on May 31, 2012; U.S. application Ser. No. 13/801,319, Rapid Recovery From Downtime Of Mirrored Storage Device, filed by Juan R. Loaiza, et al. on May 13, 2013; and U.S. patent application Ser. No. 13/840,811, entitled Method To Accelerate Queries Using Dynamically Generated Alternate Data Formats In Flash Cache, filed by Juan Loaiza, et al. on Mar. 15, 2013, the contents of which are hereby incorporated herein by reference as if fully set forth herein.

FIELD OF THE INVENTION

The present invention relates to data storage, and in particular, to data initialization.

BACKGROUND

Data storage devices may use different types of storage to store and provide access to data, such as primary storage and one or more caches. Primary storage is where data is primarily and persistently stored, and the cache is where data is stored to provide quick access to data. The cache is used to improve the efficiency of the corresponding data storage device. The cache typically includes memory hardware that is more expensive but more quickly accessed than that of primary storage. For example, the cache may be volatile memory or non-volatile flash memory and the primary storage may be disk-based storage.

During certain database operations, such as the initialization of a blank file, large amounts of data must be written to persistent storage. Often, a region of such data can be described completely by a relatively small amount of metadata. In a simplest instance, a blank file is initialized in binary format as all zeroes.

Other metadata may describe the header and/or the body of other blank file formats, including proprietary formats for blank files. Before using a newly created blank database file, the database must initialize each data block allocated for the file. However, writing an initialized blank file generated can be a time consuming process, especially for large files.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
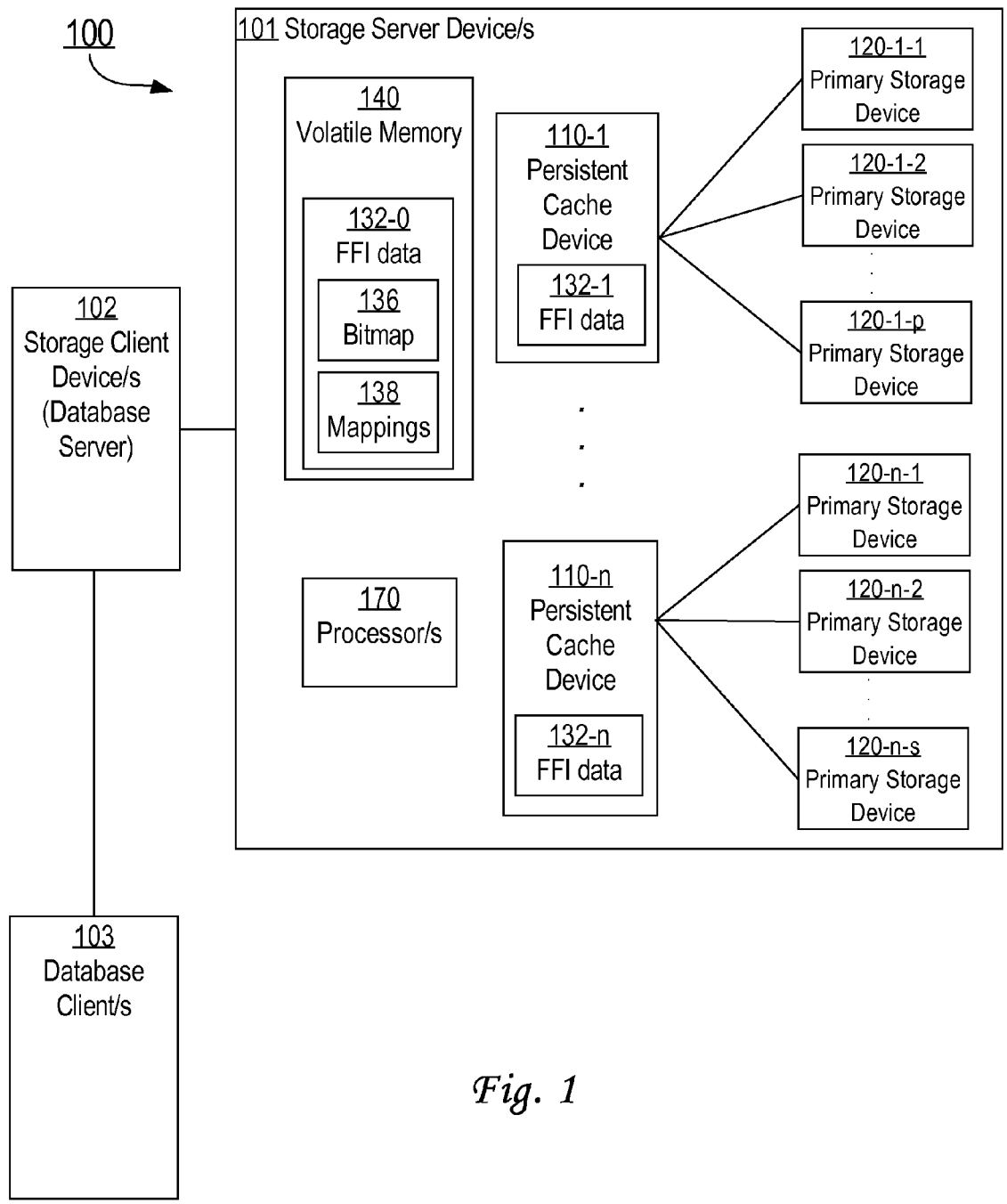
FIG. 1 is a block diagram depicting an embodiment of a storage server device.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are techniques for fast file initialization, including fast file initialization performed by a storage server device. Typically, when a new file is created or an existing file is extended in size, new space is allocated for the file, and the newly allocated space is initialized. Initialization involves writing over the allocated space, such as by zeroing out bits in the allocated space. This prevents the problem of accessing old data previously stored in the same physical space.

In fast file initialization, when a new file is created or an existing file is extended, a plurality of data blocks are allocated but not initialized in primary storage. Instead, file template metadata that describes the new file or extended file is cached. The cache may be implemented in persistent cache memory (e.g. flash memory), volatile memory, or both. The file template metadata describes the file in a manner such that portions of the "fast-initialized" file may be generated in response to one or more requests, even though the allocated data blocks were not actually initialized. As used herein, the term "fast-initialized" refers to files, allocation units and/or blocks that have been allocated but not initialized in primary storage. In a database, fast file initialization allows for fast completion of database requests to create or extend data files, and also minimizes performance impact on later database inputs and outputs (I/Os).

Fast file initialization may be performed at a granularity of an allocation unit. An allocation unit refers to a particular amount of memory in primary storage. A file may be allocated one or more allocation units. In one embodiment, mappings are maintained from fast-initialized allocation units to the corresponding file template metadata.

Embodiments described herein provide methods for handling operations on data corresponding to data blocks of fast-initialized files. In response to a read request involving a fast-initialized allocation unit, the file template metadata stored in the cache may be used to generate the allocation unit or a portion thereof based on the file template metadata. In response to a write request involving a fast-initialized allocation unit, the file template metadata stored in the cache may be used to generate the allocation unit or a portion thereof based on the file template metadata.

In one embodiment, generated allocation units or portions thereof may be written to primary storage, such as after a write request. A data structure may be maintained to determine whether blocks within each allocation unit have been written to primary storage. When all the blocks of an allocation unit have been written to primary storage, the allocation unit may be treated as a regular allocation unit. For example, tracking data that identifies the allocation unit as a fast-initialized allocation unit may be removed.

Illustrative Storage Device

FIG. 1 is a block diagram depicting an embodiment of storage device which may be used with one or more embodiments described herein. Database system 100 includes one or more storage server device/s 101. In one embodiment, storage server device 101 comprises one or more processors 170, at least one set of volatile memory 140, at least one persistent cache device 110, and at least one primary storage device 120.

In one embodiment, one or more storage server devices 101 are storage servers that handle data requests from one or more storage client devices 102. For example, one or more database servers 102 may be clients of storage server device 101. Storage server devices may also function as storage client devices 102 to another storage server device 101.

In one embodiment, storage client device/s 102 interact with storage server device/s 101 by sending one or more requests. For example, database server/s 102 may send one or more requests to storage server device/s 101 to manage data stored in a corresponding database. In turn, database server/s 102 may send these requests in response to one or more database requests from database client/s 103. In one embodiment, database client/s 103 access data stored in storage server device/s 101 via database server 102 and do not otherwise have direct access to the data. In one embodiment, storage client device 102 is a multi-node database server with each node running an instance of a database server and having shared access to storage server device/s 101. The techniques described herein are not limited to cases where the storage device clients are database servers.

Memory devices can be volatile or non-volatile. A volatile memory device does not store data after the device is powered off, while a non-volatile memory device continues to store data after the device is powered off. When the non-volatile memory device is powered back on, the data that was previously stored on the device can be read. Examples of non-volatile memory devices include disk drive devices, flash memory devices, and storage servers.

Storage server device/s 101 includes one or more persistent cache devices 110, such as persistent cache devices 110-1 to 110-$n$. A persistent cache device 110 is a non-volatile memory device, such a flash memory device. However, other types of non-volatile memory may be used.

Storage server device/s 101 further includes one or more primary storage devices 120, such as primary storage devices 120-1-1 to 120-$n$-$s$. Primary storage device/s 120 are non-volatile memory devices, such as magnetic disk drives. However, other types of non-volatile memory may be used. In one embodiment, the non-volatile memory device selected for the persistent cache device/s 110 is a higher-speed memory type than the non-volatile memory device selected for the primary storage device/s 120.

In one embodiment, a particular persistent cache device 110 serves as a cache for a particular set of primary storage devices 120. For example, persistent cache device 110-1 serves as a cache for primary storage devices 120-1-1 to 120-1-1-$p$, while persistent cache device 110-$n$ serves as a cache for primary storage devices 120-$n$-1 to 120-$n$-$s$. As depicted in FIG. 1, two persistent cache devices 110 are each coupled to and serve as a cache for three illustrated primary storage devices 120, although the present invention is not limited to any particular number of primary storage devices 120, persistent cache devices 110, or configurations thereof.

Allocation Units

Figure 2:
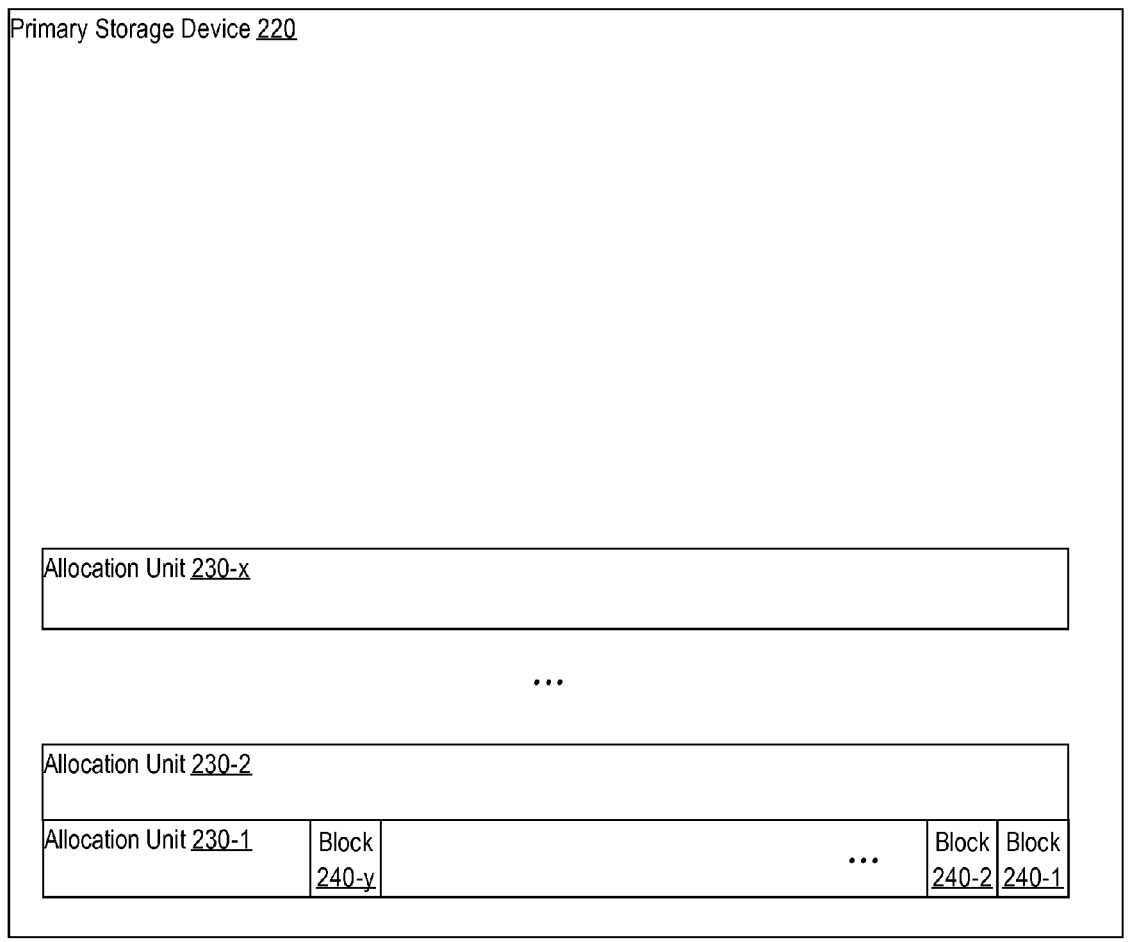
FIG. 2 is a block diagram depicting an embodiment of a primary storage device.

FIG. 2 is a block diagram depicting an embodiment of a primary storage device. Primary storage device 220 is divided up into a plurality of allocation units 230. In one embodiment, all or substantially all of the available storage space on primary storage device 220 is divided up into allocation units, such as allocation units 230-1 to 230-$x$. Alternatively, a portion of primary storage device 220 may be otherwise apportioned. In storage server device 101, the plurality of primary storage devices 120 may all be divided up into allocation units. Alternatively, one or more primary storage devices may be otherwise apportioned.

In one embodiment, the allocation unit size of each allocation unit 230 is determined based on another system variable, such as a system allocation unit size. One example of a system allocation unit size is the Oracle™ Automatic Storage Management (ASM) allocation unit size, which is selected from 1, 2, 4, 8, 16, 32, or 64 MB in one version. However, the allocation unit size for fast file initialization is not limited to any system allocation unit size or other system variable.

In one embodiment, allocation units 230 are further divided into a plurality of blocks 240 of a smaller block size. In one embodiment, all or substantially all of the available space in allocation units 230 is divided up into blocks 240. Alternatively, at least a portion of one or more allocation units 230 may be otherwise apportioned.

In one embodiment, when new space is allocated for a file using fast file initialization, the allocation is performed on an allocation unit basis. I/O for fast-initialized data is handled differently from I/O for other data, which shall be described in greater detail hereafter. In one embodiment, to properly handle I/O for fast-initialized data, fast file initialization (FFI) data 132 is maintained to identify allocation units 230 that are fast-initialized, and to associate the correct file template metadata with the corresponding allocation unit 230.

In one embodiment, FFI data 132 is maintained in volatile memory 140, such as FFI 132-0. Alternatively and/or in addition, FFI data 132 is maintained in one or more of persistent cache device/s 110, such as FFI data 132-1 to 132-$n$. In one embodiment, at least a portion of FFI data 132 is maintained in both volatile memory 140 and persistent cache device/s 110.

In one embodiment, a set of mappings 138 is maintained from an identifier (ID) of a fast-initialized allocation unit 230 to the corresponding file template metadata. In one embodiment, the identifier is a globally unique identifier (GUID) that uniquely identifies the particular allocation unit in a set of one or more storage server devices 101. The set of mappings may also be used to determine whether a particular allocation unit 230 is fast-initialized (i.e. allocated but not fully initialized). For example, if no mapping exists for a particular allocation unit ID, then it may be determined that the allocation unit 230 is not fast-initialized.

In one embodiment, mappings 138 is implemented as a hash table where a unique identifier of an allocation unit is the key and the file template metadata is the value. When a file is fast initialized, the appropriate metadata is added to the hash table for each allocation unit 230.

Tracking Blocks within Allocation Units

In one embodiment, one or more blocks 240-1 to 240-$y$ of an allocation unit 230 may be independently written to primary storage. For example, a write to one or more blocks 240 of a particular allocation unit 230 may be directly written to primary storage. The piecewise writing of one or more blocks 240 to primary storage will be described in further detail hereafter. After a particular block is written to primary storage, the particular block is no longer considered fast-initialized since the file template metadata corresponding to the allocation unit 230 no longer describes the particular block. However, as long as the allocation unit 230 has one or more fast-initialized blocks, the allocation unit 230 is still treated as fast-initialized.

In one embodiment, tracking data is maintained to determine whether a particular block is currently described by the file template metadata of the corresponding allocation unit 230. If not, an operation on the particular block does not need to be handled based on fast file initialization techniques. For example, the operation can be directly performed on the corresponding primary storage device 120, even if the corresponding allocation unit 230 has file template metadata associated with it.

In one embodiment, the tracking data comprises bitmap 136, where each block 240 of a fast-initialized allocation unit 230 is represented by a bit. For example, a fast-initialized block may be represented by a "1" value until the block is written to the corresponding primary storage device 120. When the block is written to the corresponding primary storage device 120, the value is changed to "0".

When all the blocks 240 of a particular allocation unit have been written to primary storage, the particular allocation unit no longer requires special handling as a fast-initialized allocation unit by storage server device 101. In one embodiment, after all blocks 240 of a particular allocation unit have been written to primary storage, the corresponding FFI data 132, such as mappings 138 and bitmap data 136, is removed from volatile memory and/or persistent cache device 110.

Handling Initialization Requests

To handle a request to create a new file or to extend an existing file, a set of one or more allocation units are allocated but not initialized in primary storage. The initialization request comprises or otherwise identifies file template metadata that describes the new file or at least a portion of the extended file. In one embodiment, fast file initialization is only performed for files that are greater than the size of an allocation unit.

The file template metadata may describe the header, the body, and/or the tail of a blank file or a portion thereof, including proprietary formats for blank files. In one embodiment, the file template metadata may refer to one or more patterns, templates or other structured data already stored on storage server device 101. Other methods of compressing or otherwise reducing the amount of data transmitted as file template metadata may be used. Such techniques may reduce network traffic related to initialization.

The file template metadata corresponding to the file is cached. The cache may be stored in persistent cache memory such as flash memory, volatile memory, or both. The initialization request may be acknowledged as if the file were written to primary storage. Writing an initialized blank file can be a time consuming process, especially for large files. In a database, fast file initialization allows for fast completion of database requests to create or extend data files, and also minimizes performance impact on later database I/Os.

In one embodiment, a lookup will be performed by storage server device 101 on I/Os to determine if they correspond to an allocation unit (or other region) identified as fast-initialized. If no entry is identified in the lookup, I/Os will be handled normally as configured in storage server device 110. Otherwise, they will be handled as described below.

Handling Write Requests

When a new write request involves one or more allocation units that are fast-initialized, the new data may be directly written to primary storage. FFI data is then updated to describe the changes. Particularly, bitmap 136 is updated to reflect blocks that are overwritten.

Figure 3:
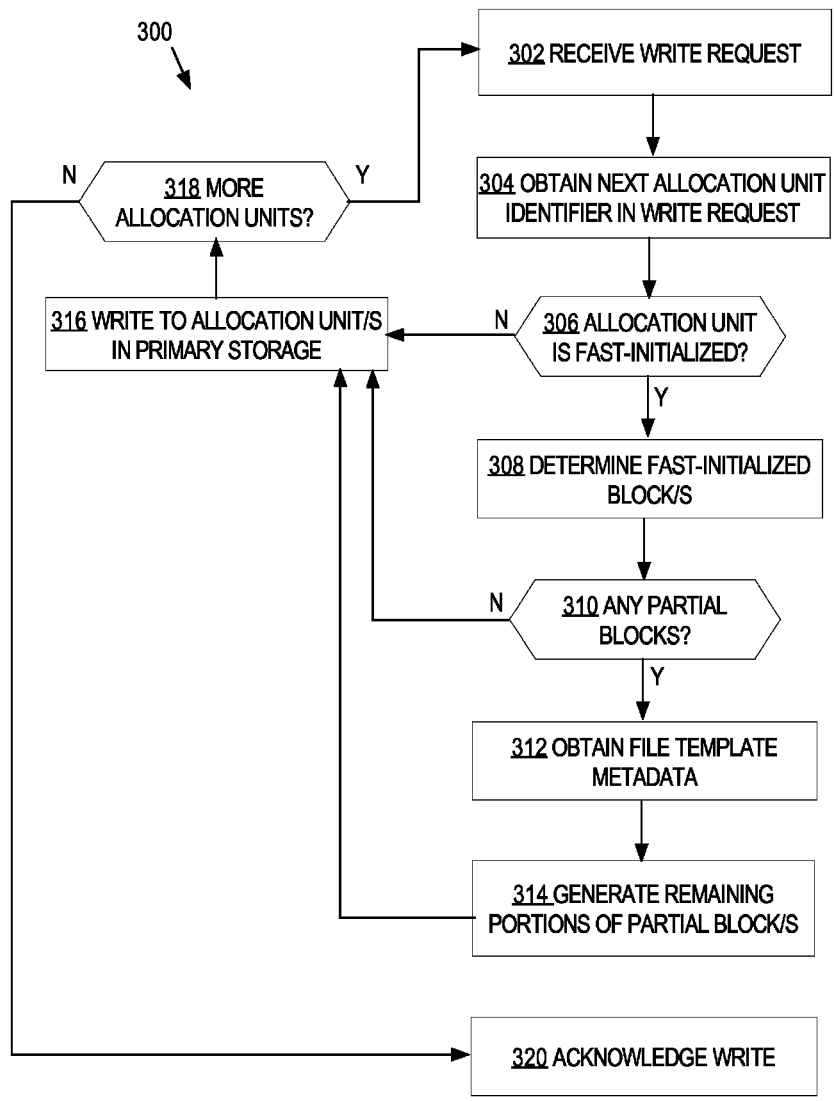
FIG. 3 is a flow diagram that illustrates an embodiment of a process for responding to a write request.

FIG. 3 is a flow diagram that illustrates an embodiment of a process for responding to a write request. Process 300 may be performed by one or more computing devices. For example, one or more steps of the method may be performed by computer system 600 or a storage server device 101.

At block 302, a write request is received. In one embodiment, the write request is received by storage server device 101 from a storage client device 102, such as a database server. The write request involves a write operation to at least a portion of one or more allocation units 230.

At block 304, an allocation unit identifier in the write request is obtained. In one embodiment, the allocation unit identifier includes a GUID and an offset that, together, uniquely specify a location in a primary storage device 120 of storage server device/s 101. The GUID uniquely identifies a disk or disk region, which may be physical or virtualized. The offset comprises data identifying a location within the identified disk.

At decision block 306, it is determined whether a particular allocation unit corresponding to the allocation unit identifier is fast-initialized. If it is determined that the particular allocation unit is not fast-initialized, processing proceeds to block 316. At block 316, the write to the particular allocation unit is performed based on a normal write procedure. For example, the write may be performed to the location in the primary storage device identified by the GUID. Otherwise, if it is determined that the particular allocation unit is fast-initialized, processing proceeds to block 308.

At block 308, fast-initialized portions of the particular allocation unit corresponding to the write request are determined. For example, when an allocation unit comprises blocks 240, it is determined whether the write operation writes to any fast-initialized blocks. In one embodiment, the fast-initialized blocks 240 of the particular allocation unit are determined based on tracking data, such as a bitmap 136.

At decision block 310, it is determined whether, of the fast-initialized blocks determined at block 308, the write operation writes to only a portion of any fast-initialized block. When fast-initialization tracking data is kept on a block by block basis, a write operation to a partial block is a special case when the block is fast-initialized. To properly update the tracking data for fast-initialized blocks, such as bitmap 136, an entire block must be written to disk. Thus, if only a portion of a particular block is in a write request, the remaining portion of the block must be generated based on the file template data corresponding to the allocation unit that the block belongs to. Because the remaining portion lies outside of the scope of the write operation, writing to the remaining portion may collide with other write operations with respect to the normal management of locks by storage server device 101. In one embodiment, when a write operation involves a fast-initialized allocation unit, the write operation will hold an exclusive lock to the entire allocation unit. In one embodiment, write operations are typically aligned to the blocks of an allocation unit, but out-ofalignment write operations are allowed, resulting in writes to only a portion of one or more blocks, or writes to a partial block.

When a write operation writes to a full fast-initialized block, the write operation does not need to generate any pre-write data. As used herein, the term "pre-write" refers to data corresponding to an allocation unit or block as it would have been initialized. When a write operation writes to only a portion of a fast-initialized block, pre-write data must be generated for the remaining portion of the fast-initialized block if the block is written to disk.

If it is determined that the write operation does not write to any partial fast-initialized block, processing proceeds to block 316 where the normal write procedure is performed. Otherwise, if it is determined that the write operation writes to any partial fast-initialized block, processing proceeds to block 312.

At block 312, file template metadata for the particular allocation unit is obtained from the cache, such as from persistent cache device 110 or a cache in volatile memory 140. In one embodiment, the file template metadata may be stored in a hash table that maps the GUID of the particular allocation unit to the corresponding file template metadata. The hash table may also be used to determine whether the particular allocation unit is fast-initialized, such as in decision step 306.

At block 314, remaining portions of any partial blocks involved in the write operation are generated based at least in part on the corresponding file template metadata.

At block 316, the data is written to the particular allocation unit using normal write procedures. The data written may include data from the write request and/or data generated based on the file template metadata. Although process 300 shows the write operation performed piecewise for each allocation unit, the write request may be handled in any order or manner after checking, generating and/or updating the relevant data. In one embodiment, the tracking data, such as bitmap 136, is updated to reflect that the blocks involved in the write operation are no longer fast-initialized.

When it is determined that no more allocation units need to be processed in decision block 318, processing continues to block 320, where the write is acknowledged to the source of the write request.

Handling Read Requests

An allocation unit 230 may be described by file template metadata. When an allocation unit 230 is not fast-initialized, reads from the allocation unit 230 will be performed in a standard manner by storage server device 101, such as by reading from the corresponding location on the associated primary storage device 220.

If an allocation unit 230 is fast-initialized, reads from at least a portion of allocation unit 230 may involve generating at least a portion of a pre-write allocation unit based at least in part on the file template metadata. Because portions of data of allocation unit 230 may not be initialized or written over with new data, such data portions are generated when a read operation is performed rather than trying to read the data from the actual region on the primary storage device 220.

Figure 4:
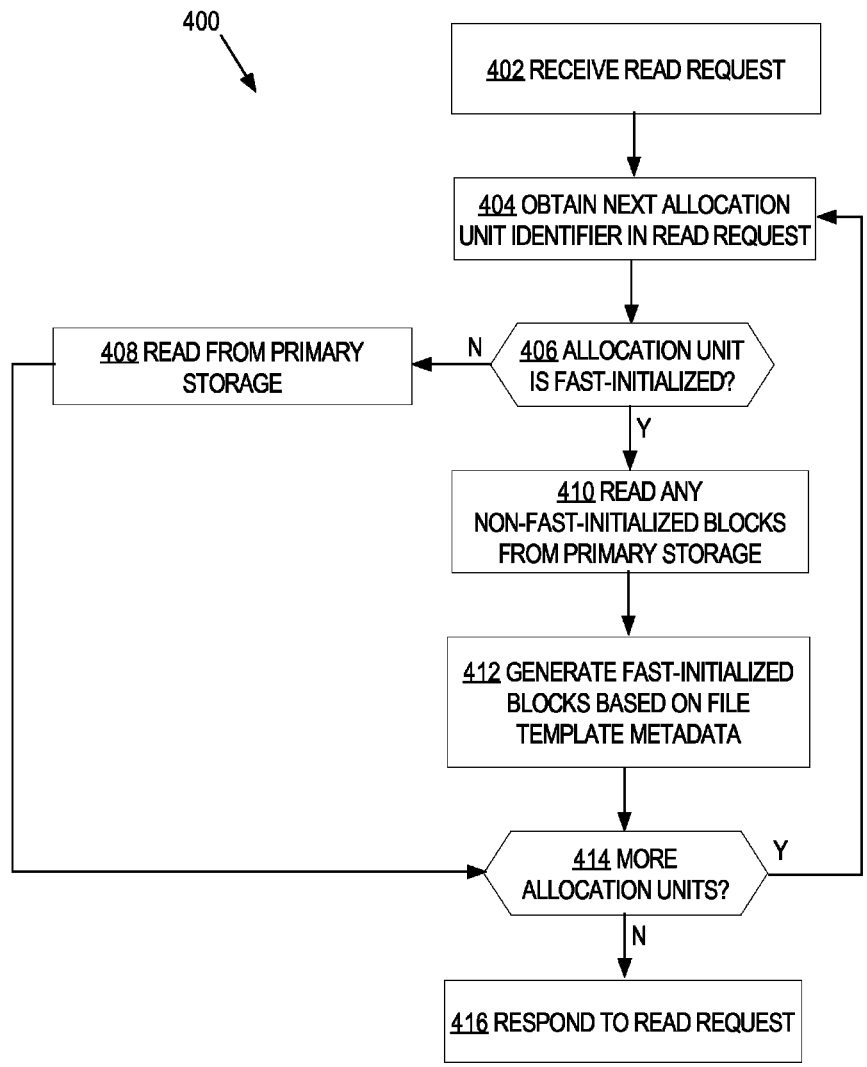
FIG. 4 is a flow diagram that illustrates an embodiment of a process for responding to a read request.

FIG. 4 is a flow diagram that illustrates an embodiment of a process for responding to a read request. Process 400 may be performed by one or more computing devices. For example, one or more steps of the method may be performed by computer system 600 or a storage server device 101.

At block 402, a read request is received. In one embodiment, the read request is received by storage server device 101 from a storage client device 102, such as a database server. The read request involves a read operation from at least a portion of one or more allocation units 230.

At block 404, an allocation unit identifier in the read request is obtained. In one embodiment, the allocation unit identifier is a GUID that uniquely specifies a location in a primary storage device 120 of storage server device/s 101.

At decision block 406, it is determined whether a particular allocation unit corresponding to the allocation unit identifier is fast-initialized. If it is determined that the particular allocation unit is not fast-initialized, processing proceeds to block 408. At block 408 the read on the particular allocation unit is performed based on a normal read procedure. For example, the read may be performed based on the location in the primary storage device identified by the GUID. Otherwise, if it is determined that the particular allocation unit is fast-initialized, processing proceeds to block 410.

At block 410, any reads from non-fast-initialized portions of the particular allocation unit are performed based on a normal read procedure. In one embodiment, the non-fast-initialized blocks 240 of the particular allocation unit are determined based on tracking data, such as a bitmap 136 that identifies which blocks 240 of a fast-initialized allocation unit are fast-initialized.

At block 412, fast-initialized portions identified in the read request are generated based at least in part on the corresponding file template metadata. In one embodiment, the fast-initialized blocks 240 of the particular allocation unit are determined based on tracking data, such as a bitmap 136 that identifies which blocks 240 of a fast-initialized allocation unit are fast-initialized.

At decision block 414, it is determined whether the read request refers to more allocation units. If it is determined that the read request refers to more allocation units, processing proceeds to block 404, where the next allocation unit identifier in the read request is obtained and processed as described in blocks 406-412. Otherwise, if it is determined that the read request does not refer to any more allocation units, processing continues to block 416.

At block 416, the read request is responded to. The response may include at least one of data read from primary storage and data generated in accordance with fast file initialization techniques. When the response includes both types of data, the data read using normal procedures may be stitched together with the data generated based on the file template metadata.

In one embodiments, blocks and/or allocation units generated in response to a read request may be written to persistent storage by a separate process, such as a background process.

Fast-Initialization Status Termination

As described earlier, an allocation unit or block is considered fast-initialized if at least a portion of the allocation unit or block has been allocated but not initialized in primary storage. Furthermore, an allocation unit or block is no longer considered fast-initialized when data is otherwise written, such as by overwriting during a write operation, to primary storage. In other words, an allocation unit or block is considered fast-initialized when a portion of the allocation unit or block is still describable by the file template metadata, and this portion has not been written to primary storage.

In one embodiment, tracking data is kept on a per block basis to determine which blocks are completely written to primary storage and which blocks remain fast-initialized. After a block is written to primary storage, the tracking data, such as bitmap 136, is updated to reflect that the block involved is no longer fast-initialized. For example, the data written to the block may include data that is part of a write operation or data generated for the block based at least in part on the file template metadata.

When all blocks in an allocation unit have been written to primary storage, the allocation unit is no longer fast-initialized. No portion of the allocation unit is describable by the file template metadata that has not been written to primary storage. Therefore, the allocation unit no longer needs to be handled as fast-initialized. The FFI data 132 corresponding to the particular allocation unit may be removed. When the tracking data for an allocation unit is a bitmap corresponding to the blocks of the allocation unit, this state may be detected by evaluating the bitmap. The bitmap may be evaluated after processes that write a block to primary storage, thereby clearing a bit of the bitmap. Examples of such processes include a write process that writes a fast-initialized block to primary storage, or a background process configured to flush allocation units, which shall be described in greater detail hereafter.

After a particular allocation unit is fully written to disk, the mapping from the particular allocation unit to the corresponding cached file template metadata may be removed. In one embodiment, a mapping from the GUID to the file template metadata is removed from mappings 138. For example, when mappings 138 comprises a hash table, the file template metadata may be removed as the value for the GUID key. In one embodiment, the entry for the allocation unit is marked as invalidated and a garbage collection process handles one or more changes to the FFI data.

In one embodiment, a copy of the file template metadata is stored for each allocation unit. Alternatively, a copy of the file template metadata may be stored for each file, even if a file corresponds to multiple allocation units. In this case, the allocation units associated with a file are mapped to the file template data by their association with the file. When no allocation units are directly or indirectly mapped to a specific file template metadata, the specific file template metadata can be deleted from the cache.

After a particular allocation unit is fully written to disk, the particular allocation unit is no longer considered fast-initialized. Any cached data corresponding to the particular allocation unit, including blocks and tracking data, may be removed. For example, blocks of the allocation unit, including blocks that were generated in response to write requests, may be deleted from the persistent cache device 110.

Flushing Fast-Initialized Data to Disk

In one embodiment, storage server device 101 periodically frees up space in the cache by "flushing" fast initialized allocation units by writing them to disk and removing them from the FFI data.

In one embodiment, fast-initialized allocation units are flushed, or written to primary storage, in order to maintain the size of the fast file initialization data stored, such that any FFI data 132 stored in volatile memory 140 and/or any FFI data 132 stored in persistent cache memory, such as persistent cache device/s 110.

When a portion of the blocks 240 of an allocation unit 230 has been written to primary storage device 120, flushing comprises generating and/or writing the remaining blocks of the allocation unit to the primary storage device 120. In one embodiment, bitmap 136 is used to determine which blocks have not been written to primary storage device 120. In one embodiment, where one or more generated blocks have been cached, such as in persistent cache devices 110, the cached blocks are written to the primary storage device 120 and removed from persistent cache devices 110.

Blocks are generated based at least in part on the corresponding file template metadata. For example, when the allocation unit containing the unwritten blocks is mapped to a particular file template metadata in mappings 138, the particular file template metadata is used to generate the unwritten blocks and write them to the allocation units on the corresponding primary storage device 120.

Flushing an allocation unit may conflict with client write requests. In one embodiment, a synchronization mechanism is implemented to prevent such issues. Locking mechanisms may be emulated to synchronize the flushing of fast-initialized data blocks and client write requests to the same allocation unit. In one embodiment, locking is implemented to (1) allow client writes and reads to be concurrent in an allocation unit, and (2) prevent flushing from occurring at the same time as client writes or reads. A mutex system may be implemented to emulate such locking mechanisms since traditional read/write locks of storage server device 101 are typically not usable because I/Os need to be asynchronous to avoid tying up threads.

Flushing of one or more allocation units to primary storage devices 120 may be scheduled to prevent overloading one or more components of storage device/s 110. In one embodiment, flushing is performed by a background process such that the original file creation or file extension request can be acknowledged without waiting for the initialization of the allocation units. The background process writes the appropriate blocks to primary storage at a later time.

Write-Back Storage Cache

In one embodiment, storage server device 110 has the capability to cache one or more portions of a primary storage device 120 in persistent cache device 110. A representation of a data block in a primary storage device 120 that is stored in persistent cache device 110 is referred to herein as a "cached data block." In one embodiment, the cached data blocks are allocation units. Each persistent cache device 110 may be configured to cache data blocks of one or more primary storage devices 120. For example, persistent cache device 110-1 may be communicatively coupled with primary storage devices 120-1-1, 12-1-2 . . . 120-1-p to efficiently cache data blocks of these primary storage devices. The caching of data blocks is described in greater detail in U.S. application Ser. No. 13/288,785, entitled Write-Back Storage Cache Based on Fast Persistent Memory, filed by Bharat Chandra Baddepudi, et al. on Nov. 3, 2011, which is incorporated in its entirety above.

To prevent data loss, at least a portion of FFI data 132 may be written to persistent cache devices 110. In one embodiment, the fast file initialization data will share flash space with a Write Back Flash Cache. If the flash memory or other persistent cache device fails, regions covered by fast file initialization will be repaired by flash resilvering in accordance with the Write-Back Storage Cache techniques incorporated by reference herein.

Furthermore, Write-Back Storage Cache techniques describe one or more ways to use the cache to emulate primary device storage in an efficient manner. Thus, when the techniques described herein with respect to fast file initialization are described as reading from or writing to a primary storage device or otherwise "normally" performing a read or write operation, one or more blocks or allocation units may be written to a persistent cache device 110 based on the Write-Back Storage Cache techniques.

Caching Writes

Typically, it is more efficient to perform one larger write operation rather than a plurality of small write operations. In one embodiment, small writes are cached in accordance with the Write-Back Storage Cache techniques before writing a block of data to primary storage. Bitmap 136 and/or the interpretation thereof may be adapted to implement this optimization.

Example Fast File Initialization Process

Figure 5:
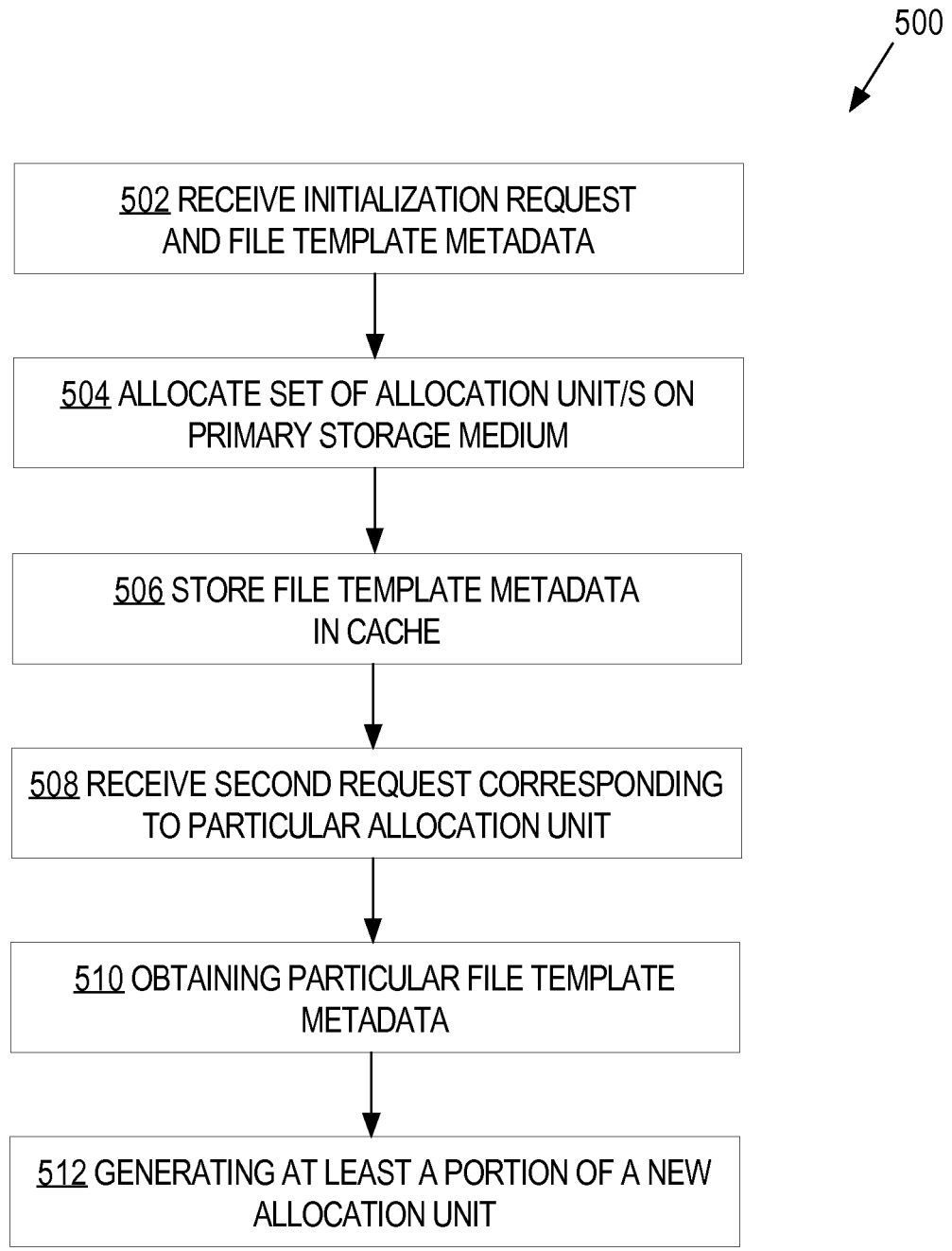
FIG. 5 is a flow diagram that illustrates an embodiment of a process for fast file initialization.

FIG. 5 is a flow diagram that illustrates an embodiment of a process for fast file initialization. Process 500 may be performed by one or more computing devices. For example, one or more steps of the method may be performed by computer system 600 or a storage server device 101.

At block 502, an initialization request to create a new file or to extend a file is received. In one embodiment, the file is a data file of a database. The initialization request comprises or otherwise identifies file template metadata.

At block 504, a set of allocation units are allocated for the file on a primary storage medium without initializing the set of allocation units. For example, the allocation units may be allocated on a primary storage device 120. The set of allocation units comprises at least one allocation unit. In one embodiment, fast file initialization is only performed for files that are at least the size of one allocation unit.

At block 506, the file template metadata corresponding to the set of allocation units are cached. In one embodiment, the file template metadata is cached in volatile memory, fast persistent memory such as a persistent cache device 110, or both. In one embodiment, the file template metadata is stored in the persistent cache for persistency, and cached in volatile memory to avoid the overhead of reading from a persistent cache. The file and/or allocation units may be mapped to the corresponding file template metadata. In one embodiment, the file template metadata is stored on a per allocation unit basis. For example, a hash table may comprise key-value pairs, where each pair comprises a GUID as the key and file template metadata as the value.

At block 508 a second request is received corresponding to a particular allocation unit.

At block 510, particular file template metadata associated with the particular allocation unit is obtained. For example, the GUID or other identifying data corresponding to the particular allocation unit may be used to look up the file template metadata. In one embodiment, the look up is used to determine whether the particular allocation unit is fast-initialized. For example, when no file template metadata is associated with the GUID of an allocation unit, then the allocation unit is not fast-initialized.

At block 512, assuming that the particular allocation unit is fast-initialized and the particular file template metadata was obtainable at block 510, at least a portion of a new allocation unit is generated. In one embodiment, at least a portion of a pre-write allocation is generated based at least in part on the file template metadata.

Database Systems

A database management system manages a database. A database management system may comprise one or more database servers. A database comprises database data and metadata that is stored on a persistent memory mechanism, such as a set of hard disks. Metadata defines database objects, such as relational tables, table columns, views, and triggers.

Database applications and clients interact with a database server by submitting to the database server commands that cause the database server to perform operations on data stored in a database. A database command may be in the form of a database statement that conforms to a database language.

One of the languages for expressing database requests is the Structured Query Language (SQL). There are many different versions of SQL; some versions are standard, others are proprietary. There is also a variety of extensions to SQL. SQL data definition language (DDL) instructions may be issued to a database server to create or configure database objects, such as tables, views, or complex data types. SQL/XML is a common extension of SQL used when manipulating XML data in an object-relational database.

Generally, data is logically arranged within a database in one or more data containers. Each container contains records, and the data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the presented approach are not limited to any particular type of data container or type of database architecture. However, for the purpose of explanation, the examples and the terminology used herein are usually associated with relational or object-relational databases. Thus, the terms "table," "row," and "column" are used herein to refer respectively to the data container, record, and field.

Data containers are typically stored on a hard disk in one or more data blocks. Hence, while instructions or queries issued to a database server refer to data as tables, rows, and columns, that data is actually stored in a database as a collection of data blocks. Through the use of various stored metadata, indexes, and headers, the database server is able to interpret the data within the data blocks as logical tables, rows, and columns.

A data block is an atomic unit of storage space allocated to store raw data for one or more database records (e.g., rows) or portions thereof. Typically, a database system is configured to read and write database records from persistent cache and volatile memory in units no smaller than data blocks. When a record, from a data block, needs to be retrieved, an entire data block containing the record (or pertinent portion of the record) is read into a buffer that the database system uses to temporarily store data blocks. The data block read into the buffer may contain other records or portions thereof.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
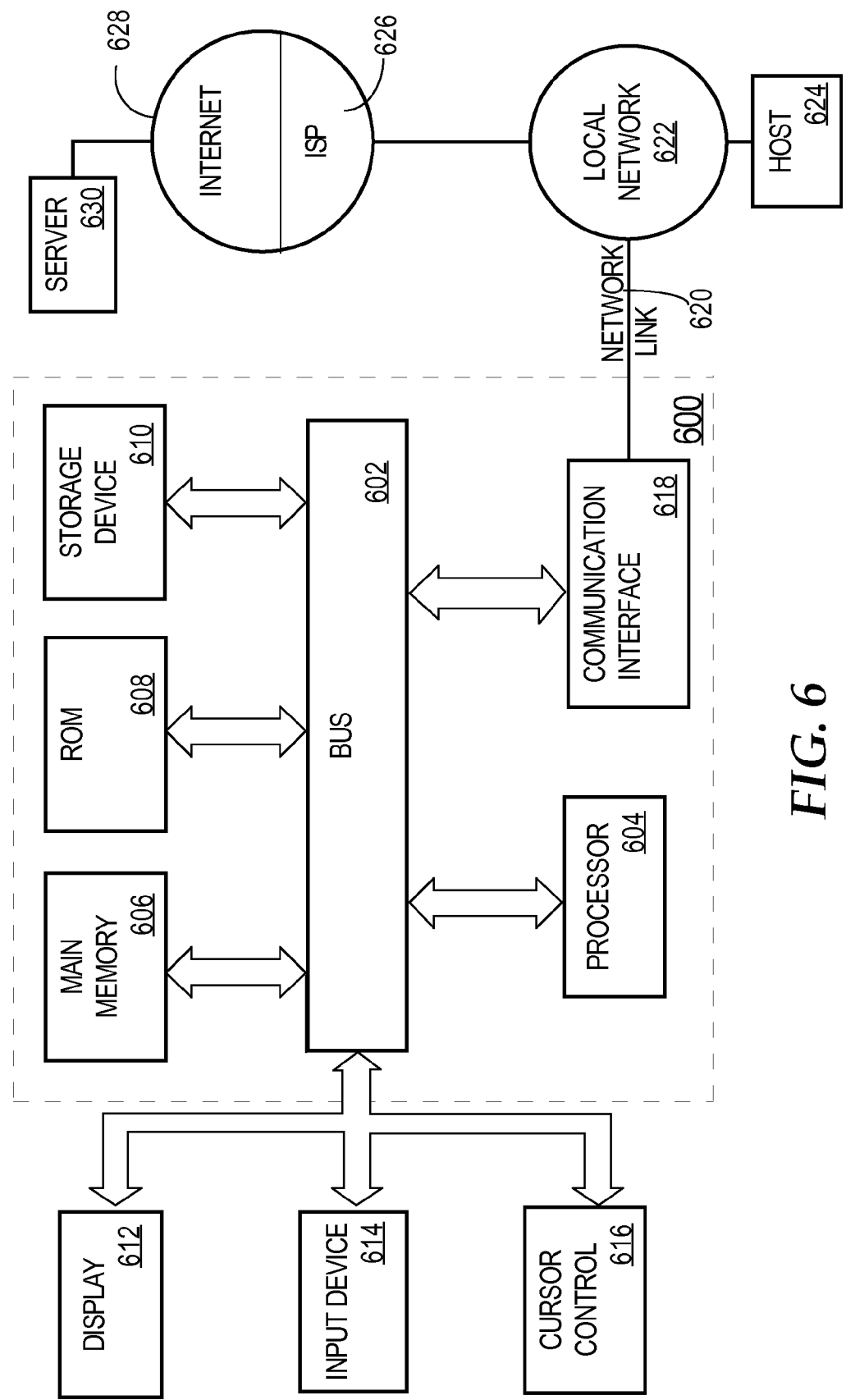
FIG. 6 illustrates a computer system upon which one or more embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving an initialization request to create or extend a file, wherein the initialization request comprises or identifies file template metadata comprising a template that describes at least a non-zero portion of a blank file;
allocating a set of allocation units comprising at least one allocation unit for the file on a primary storage medium without initializing at least a portion of the file on the primary storage medium;
storing the file template metadata in at least one of a volatile memory cache and a persistent memory cache;
receiving a second request corresponding to a particular allocation unit of the set of allocation units;
obtaining particular file template metadata associated with the particular allocation unit; and
in response to the second request, generating at least a portion of the particular allocation unit based on the template;
wherein the method is performed by one or more computing devices.

2. The method of claim 1, wherein generating at least a portion of the particular allocation unit comprises generating at least a portion of a pre-write allocation unit based at least in part on the file template metadata.

3. The method of claim 1,
wherein the second request is a write request to the particular allocation unit; and
wherein generating at least a portion of the particular allocation unit is based at least in part on the write request.

4. The method of claim 3,
wherein generating at least a portion of the particular allocation unit comprises generating at least one block of the particular allocation unit and updating tracking data corresponding to blocks of the particular allocation unit.

5. The method of claim 1, further comprising:
caching a plurality of write requests to a selected allocation unit of the set of allocation units; and
generating the selected allocation unit based at least in part on the cached plurality of write requests.

6. The method of claim 1, further comprising:
storing said at least a portion of the particular allocation unit in persistent cache storage associated with the primary storage medium.

7. The method of claim 6, further comprising:
receiving a third request corresponding to a block of a second allocation unit;
determining, based on tracking data for the second allocation unit, whether the block is stored in the persistent memory cache;
responsive to determining that the block is stored in the persistent memory cache, accessing the block in the persistent memory cache;
responsive to determining that the block is not stored in the persistent memory cache, generating the block based at least in part on the file template metadata corresponding to the second allocation unit.

8. The method of claim 6, further comprising:
writing a particular allocation unit stored in the persistent cache storage to a corresponding allocation unit on the primary storage medium;
terminate storing the particular allocation unit from the persistent cache storage.

9. The method of claim 1, further comprising:
storing, in volatile memory, a mapping from the at least one allocation unit for the file to the file template metadata.

10. One or more non-transitory computer-readable media storing instructions, wherein the instructions include:
instructions which, when executed by one or more hardware processors, cause receiving an initialization request to create or extend a file, wherein the initialization request comprises or identifies file template metadata comprising a template that describes at least a non-zero portion of a blank file;
instructions which, when executed by one or more hardware processors, cause allocating a set of allocation units comprising at least one allocation unit for the file on a primary storage medium without initializing at least a portion of the file on the primary storage medium;
instructions which, when executed by one or more hardware processors, cause storing the file template metadata in at least one of a volatile memory cache and a persistent memory cache;
instructions which, when executed by one or more hardware processors, cause receiving a second request corresponding to a particular allocation unit of the set of allocation units;
instructions which, when executed by one or more hardware processors, cause obtaining particular file template metadata associated with the particular allocation unit based on the template; and
instructions which, when executed by one or more hardware processors, cause, in response to the second request, generating at least a portion of the particular allocation unit.

11. The one or more non-transitory computer-readable media of claim 10, wherein generating at least a portion of the particular allocation unit comprises generating at least a portion of a pre-write allocation unit based at least in part on the file template metadata.

12. The one or more non-transitory computer-readable media of claim 10,
wherein the second request is a write request to the particular allocation unit; and
wherein generating at least a portion of the particular allocation unit is based at least in part on the write request.

13. The one or more non-transitory computer-readable media of claim 12, wherein generating at least a portion of the particular allocation unit comprises generating at least one block of the particular allocation unit and updating tracking data corresponding to blocks of the particular allocation unit.

14. The one or more non-transitory computer-readable media of claim 10, wherein the instructions include:
instructions which, when executed by one or more hardware processors, cause caching a plurality of write requests to a selected allocation unit of the set of allocation units; and
instructions which, when executed by one or more hardware processors, cause generating the selected allocation unit based at least in part on the cached plurality of write requests.

15. The one or more non-transitory computer-readable media of claim 10, wherein the instructions include instructions which, when executed by one or more hardware processors, cause storing said at least a portion of the particular allocation unit in persistent cache storage associated with the primary storage medium.

16. The one or more non-transitory computer-readable media of claim 15, wherein the instructions include:
instructions which, when executed by one or more hardware processors, cause receiving a third request corresponding to a block of a second allocation unit;
instructions which, when executed by one or more hardware processors, cause determining, based on tracking data for the second allocation unit, whether the block is stored in the persistent memory cache;
instructions which, when executed by one or more hardware processors, cause, responsive to determining that the block is stored in the persistent memory cache, accessing the block in the persistent memory; cashe;
instructions which, when executed by one or more hardware processors, cause, responsive to determining that the block is not stored in persistent memory cache, generating the block based at least in part on the file template metadata corresponding to the one second allocation unit.

17. The one or more non-transitory computer-readable media of claim 15, wherein the instructions include:
instructions which, when executed by one or more hardware processors, cause writing a particular allocation unit stored in the persistent cache storage to a corresponding allocation unit on the primary storage medium;
the instructions which, when executed by one or more hardware processors, cause terminating storing the particular allocation unit from the persistent cache storage.

18. The one or more non-transitory computer-readable media of claim 10, wherein the instructions include instructions which, when executed by one or more hardware processors, cause storing, in volatile memory, a mapping from the at least one new allocation unit to the file template metadata.

19. A system comprising:
a plurality of primary storage devices comprising a plurality of allocation units;
a plurality of persistent cache devices;
volatile memory;
one or more processors configured to:
receive an initialization request to create or extend a file, wherein the initialization request is associated with file template metadata comprising a template that describes at least a non-zero portion of a blank file;
allocate a set of allocation units of the plurality of allocation units for the file without initializing the file on the primary storage medium;
store the file template metadata in the volatile memory;
receive a read request corresponding a first allocation unit of the set of allocation units;
in response to the read request, generate at least one block of the particular allocation unit based on the file template metadata based on the template.

20. The system of claim 19, wherein the one or more processors are further configured to:
receive a write request corresponding to a second block of a second allocation unit;
store the second block of the second allocation unit in a persistent cache device corresponding to a primary storage device that contains the second allocation unit.

21. A method comprising:
receiving an initialization request to create or extend a file, wherein the initialization request comprises or identifies file template metadata;
storing the file template metadata in at least one of a volatile memory cache and a persistent memory cache;
allocating a set of allocation units comprising at least one allocation unit for the file on a primary storage medium without initializing at least a portion of the file on the primary storage medium;
receiving a second request corresponding to a particular allocation unit of the set of allocation units;
obtaining particular file template metadata associated with the particular allocation unit; and
in response to the second request, generating at least a portion of the particular allocation unit;
storing said at least a portion of the particular allocation unit in persistent cache storage associated with the primary storage medium;
receiving a third request corresponding to a block of a second allocation unit;
determining, based on tracking data for the second allocation unit, whether the block is stored in the persistent memory cache;
responsive to determining that the block is stored in the persistent memory cache, accessing the block in the persistent memory cache;
responsive to determining that the block is not stored in the persistent memory cache, generating the block based at least in part on the file template metadata corresponding to the second allocation unit;
wherein the method is performed by one or more computing devices.

22. The method of Claim 1, wherein the file template metadata describes at least a portion of a header of the blank file.

23. The method of Claim 1, wherein the initialization request identifies file template metadata comprising one or more stored patterns, templates or other structured data.

24. The one or more non-transitory computer-readable media of Claim 10, wherein the file template metadata describes at least a portion of a header of the blank file.

25. The one or more non-transitory computer-readable media of Claim 10, wherein the initialization request identifies file template metadata comprising one or more stored patterns, templates or other structured data.

* * * * *